Patented Apr. 22, 1947

2,419,200

UNITED STATES PATENT OFFICE 2,419,200

ACRIDINE COMPOUNDS AND PROCESS OF MAKING SAME

Joseph H. Burckhalter, Detroit, Albert L. Rawlins, Grosse Pointe Woods, Frank H. Tendick, Grosse Pointe Park, Eldon M. Jones, Grosse Pointe Woods, and Walter F. Holcomb, Detroit, Mich., assignors to Parke, Davis & Company, Detroit, Mich., a corporation of Michigan No Drawing. Application February 9, 1945, Serial No. 577,150

13 Claims. (Cl. 260—279)

This invention relates to a class of new basically substituted acridine compounds having the general formula for the free base

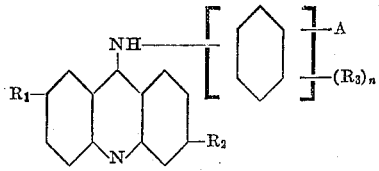

wherein $R_1$ and $R_2$ are substituents selected from the class consisting of hydrogen, lower alkyl, lower alkoxy, chlorine, bromine and —CN, and $(R_3)_n$ represents $n$ substituents $R_3$, where $n$ has one of the values 0, 1, 2 or 3 and $R_3$ is a substituent of the class consisting of hydrogen, lower alkyl, chlorine, bromine, —CN and —NO$_2$. The group A has the formula

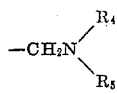

where $R_4$ may be hydrogen, lower alkyl or lower hydroxyalkyl and $R_5$ may be lower alkyl or lower hydroxyalkyl, $R_4$ and $R_5$ may be taken together with N to form a heterocyclic ring consisting of a member of the class piperidine, morpholine, thiomorpholine, piperazine, pyrrolidine and pyrrole.

These new compounds are useful therapeutic agents and, in general, they are characterized by their toxicity to plasmodia. These new compounds may be used in the form of their free bases or in the form of their salts with organic or inorganic acids such as hydrochloric acid, sulfuric acid, phosphoric acid, sulfamic acid, acetic acid, lactic acid, tartaric acid, gluconic acid, citric acid and alkyl sulfonic acids or as the insoluble salt of methylene disalicylic acid.

The new acridine compounds of the present invention may be prepared by condensing equimolar portions of a substituted aryl amine and a 9-haloacridine in a suitable solvent. The reaction may be carried out in the presence of alkaline, neutral or acidic media, and the reaction may be graphically represented as follows.

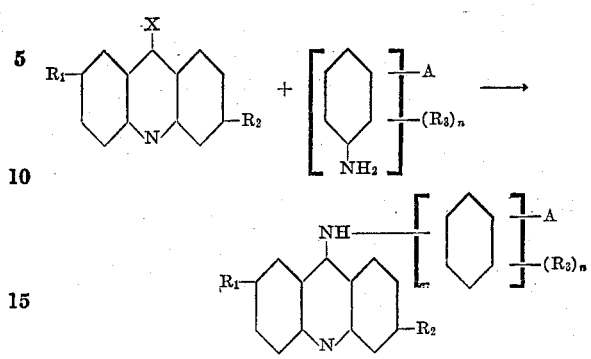

where $R_1$, $R_2$, $R_3$, A and $n$ have the values previously given and X represents a halogen such as chlorine or bromine. We prefer to carry out the condensation in the presence of a dilute or concentrated organic acid or a dilute inorganic acid.

Another method for the preparation of these heterocyclic amines of the present invention, which is, in effect, a variation of the above method using an acidic medium, involves the reaction of the substituted aryl amine and the 9-haloacridine in phenol. The desired product may be precipitated from an ether suspension of the reaction mixture by the addition of hydrogen chloride.

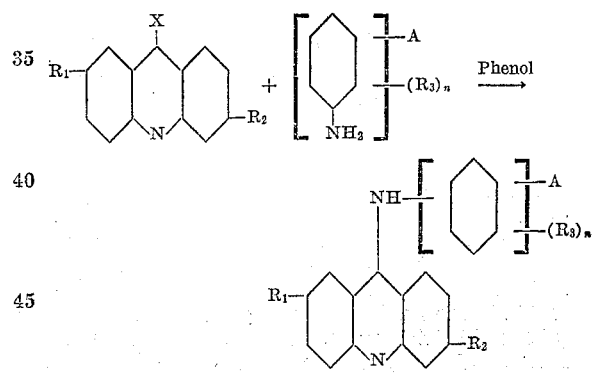

The following examples illustrate our invention without restricting it thereto:

*Example 1.—2-methoxy-6-chloro-9-(4'-diethylaminomethylanilino)-acridine dihydrochloride*

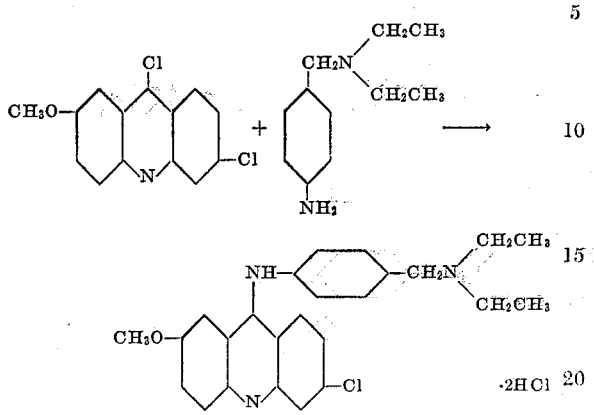

A mixture consisting of 9.6 g. (0.054 mole) of 4-(diethylaminomethyl) aniline [Bull. Soc. Chim., (4) 19, 339 (1916)] and 13.9 g. (0.05 mole) of 2-methoxy-6,9-dichloroacridine in 100 cc. of methanol is treated with hydrogen chloride in methanol until the pH of the mixture is about 4. The acidified reaction mixture is heated on a steam bath for fifteen minutes, cooled and allowed to stand overnight. The crystalline dihydrochloride is removed by filtration, washed with acetone and recrystallized from methanol; M. P. 265° C. dec.

*Example 2.—2 - methoxy - 6 - chloro - 9 - (2' - diethylaminomethylanilino)-acridine dihydrochloride*

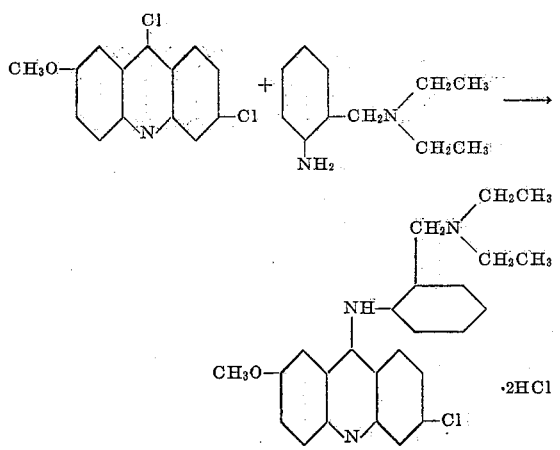

A mixture consisting of 7.5 g. (0.042 mole) of 2 - (diethylaminomethyl) aniline [Bull. Soc. Chim., (4), 19, 339 (1916)] and 11.8 g. (0.042 mole) of 2-methoxy-6,9-dichloroacridine in 100 cc. of methanol is treated with hydrogen hydrochloride in methanol until the pH of the mixture is about 4. The acidified reaction mixture is heated on the steam bath for two hours, cooled and the crude product removed by filtration. The product is purified further by washing with acetone and recrystallization from methanol.

*Example 3.—2 - methoxy - 6 - chloro - 9 - (3' - diethylaminomethylanilino)-acridine dihydrochloride*

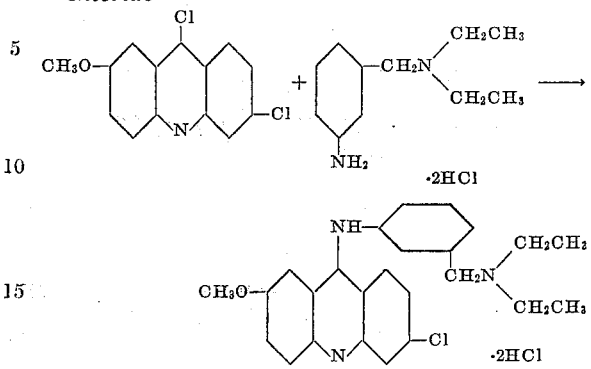

25.1 g. (0.1 mole) of 3-(diethylaminomethyl)-aniline dihydrochloride [Bull. Soc. Chim., (4), 19, 339 (1916)] and 25.03 g. (0.09 mole) of 2-methoxy-6,9-dichloroacridine suspended in 300 cc. of absolute ethanol is refluxed for two hours. The mixture is cooled, the crude dihydrochloride collected and recrystallized from methanol; M. P. 278° C.

*Example 4.—2 - methoxy - 6 - chloro - 9 - (3' - diethanolaminomethylanilino)-acridine dihydrochloride*

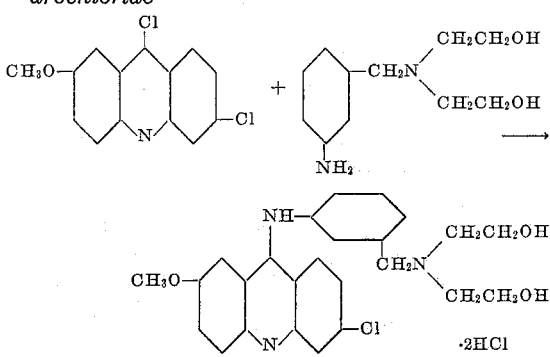

The pH of a mixture consisting of 7.5 g. (0.36 mole) of 3-(diethanolaminomethyl) aniline and 9.9 g. (0.036 mole) of 2-methoxy-6,9-dichloroacridine in 100 cc. of methanol is adjusted to 4 by the addition of hydrogen chloride in methanol. The resulting mixture is heated on a steam bath for two hours, cooled and the crystalline dihydrochloride collected. The crude product is washed with acetone and recrystallized from methanol.

*Example 5.—2 - methoxy - 6 - chloro - 9 - (3' - N - piperidylmethylanilino) - acridine dihydrochloride*

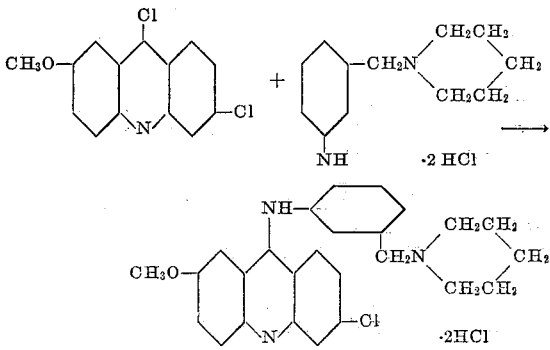

A mixture consisting of 6.5 g. (0.025 mole) of 3 - (N - piperidylmethyl) aniline dihydrochloride and 6.85 g. (0.025 mole) of 2-methoxy-6,9-dichloroacridine in 125 cc. of methanol is refluxed on a steam bath for two hours. The mixture is cooled, the crystalline dihydrochloride collected, washed with acetone and recrystallized from methanol.

*Example 6.—2 - methoxy - 6 - chloro - 9 - (3' - N - morpholinylmethylanilino) - acridine dihydrochloride*

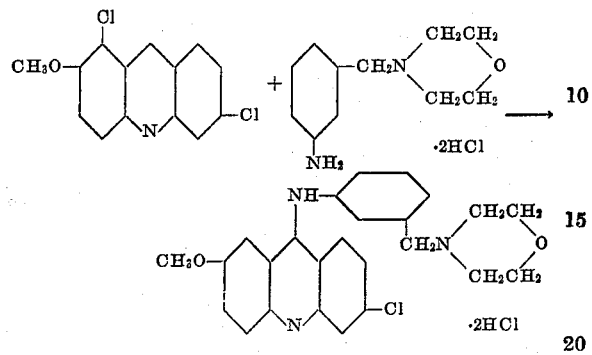

A mixture consisting of 8.5 g. (0.032 mole) of 3-(N-morpholinylmethyl) aniline dihydrochloride and 9.0 g. (0.032 mole) of 2-methoxy-6,9-dichloroacridine in 125 cc. of methanol is heated on a steam bath for two hours. The mixture is cooled and the crystalline dihydrochloride is removed by filtration. The crude product is washed with acetone and recrystallized from methanol.

*Example 7.—2 - methoxy - 6 - chloro - 9 - (4' - N - thiomorpholinylmethylanilino) acridine dihydrochloride*

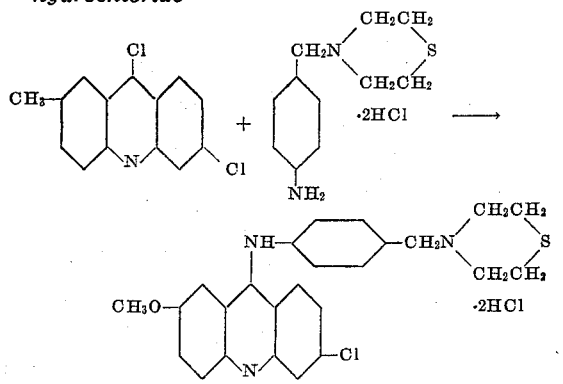

A mixture consisting of 5 g. (0.018 mole) of 4-(N-thiomorpholinylmethyl) aniline dihydrochloride and 4.95 g. (0.018 mole) of 2-methoxy-6,9-dichloroacridine in 75 cc. of methanol is refluxed for two hours, cooled and the crystalline product removed by filtration. The crude dihydrochloride is washed with acetone and recrystallized from methanol.

*Example 8.—2-methoxy-6-chloro - 9 -(2'- chloro-5'-diethylaminoethylanilino) acridine dihydrochloride*

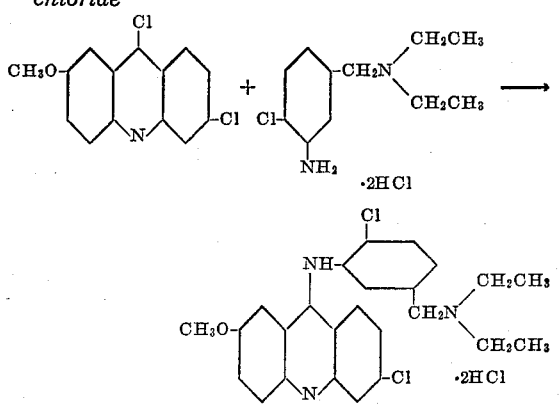

A mixture consisting of 7.5 g. (0.026 mole) of 2-chloro-5-(diethylaminomethyl) aniline dihydrochloride and 7.3 g. (0.026 mole) of 2-methoxy-6,9-dichloroacridine in 100 cc. of methanol is heated on a steam bath for two hours. The mixture is cooled, the crystalline dihydrochloride removed by filtration, washed with acetone and purified by recrystallization from methanol.

*Example 9.—2-methoxy-6-chloro-9-(2'-N-piperidylmethyl-5'-chloroanilino) acridine dihydrochloride*

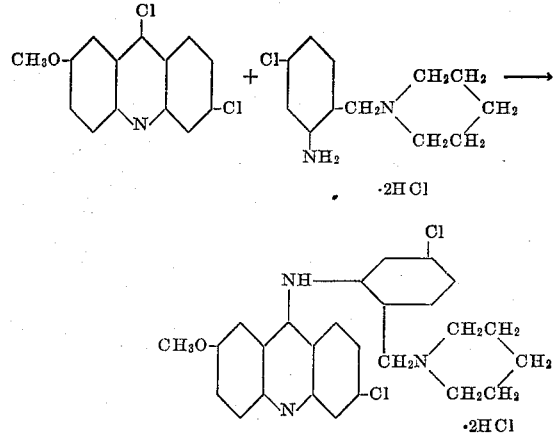

A mixture consisting of 7.5 g. (0.025 mole) of 2-(N-piperidylmethyl)-5-chloroaniline and 7.0 g. (0.025 mole) of 2-methoxy-6,9-dichloroacridine in 125 cc. of methanol is refluxed on a steam bath for two hours. The mixture is cooled, and the crude dihydrochloride removed by filtration and washed with acetone. The product is further purified by recrystallization from methanol.

*Example 10.—2-methoxy-6-bromo-9-(2'-diethylaminomethyl-5'-nitranilino) acridine dihydrochloride*

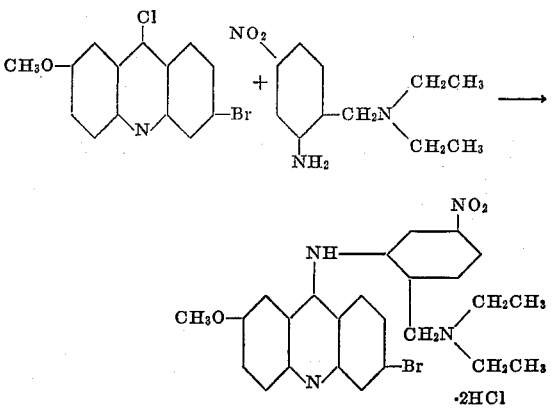

The pH of a mixture consisting of 5 g. (0.022 mole) of 2-(diethylaminomethyl)-5-nitraniline and 7.2 g. (0.022 mole) of 2-methoxy-6-bromo-9-chloroacridine in 125 cc. of methanol is adjusted to about 4 by the addition of hydrogen chloride in methanol. The resulting acidified mixture is heated for two hours on a steam bath, cooled and the crystalline dihydrochloride removed by filtration. The crude product is washed with acetone and recrystallized from methanol.

*Example 11.—2-methoxy-6-cyano-9-(3'-diethyl-aminomethylanilino)acridine dihydrochloride*

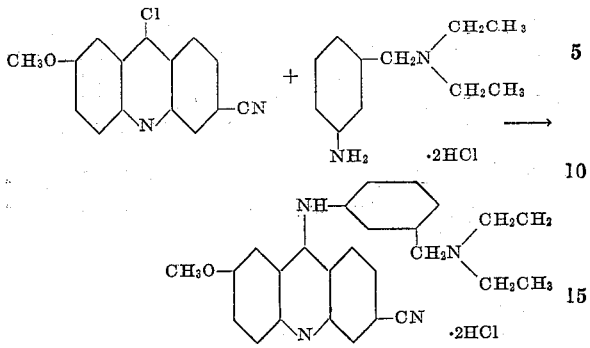

A mixture consisting of 6.5 g. (0.026 mole) of 3-(diethylaminomethyl)aniline dihydrochloride and 7.0 g. (0.026 mole) of 2-methoxy-6-cyano-9-chloroacridine in 125 cc. of methanol is heated for one hour on the steam bath, cooled and the crystalline product removed by filtration. The crude 2-methoxy-6-cyano - 9 - (3'-diethylamino-methylanilino)acridine dihydrochloride is washed with acetone and recrystallized from methanol.

*Example 12.—2-methoxy-6-cyano-9-(3'-N-piperidylmethylanilino)acridine dihydrochloride*

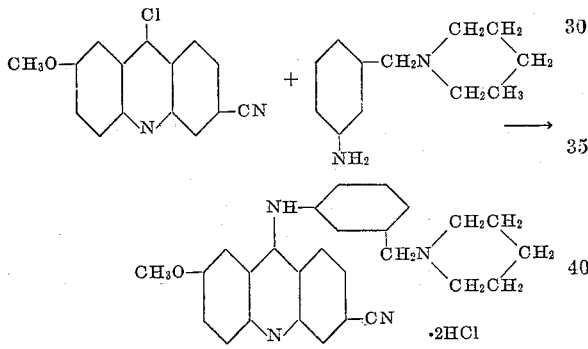

A mixture consisting of 6.85 g. (0.026 mole) of 3-(N-piperidylmethyl)aniline dihydrochloride and 7 g. (0.026 mole) of 2-methoxy-6-cyano-9-chloroacridine in 125 cc. of methanol is heated for one hour on the steam bath, cooled and the crystalline product removed by filtration. The crude 2-methoxy-6-cyano - 9 - (3'- N - piperidyl-methylanilino)acridine dihydrochloride is washed with acetone and recrystallized from methanol.

*Example 13.—2-methoxy-6-cyano-9-(2'-bromo-5'-N-piperidylmethylanilino)acridine dihydrochloride*

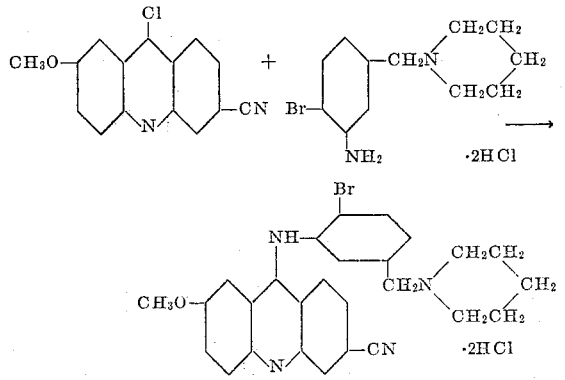

A mixture consisting of 7.0 g. (0.02 mole) of 2-bromo - 5 - (N-piperidylmethyl)aniline dihydrochloride and 5.5 g. (0.02 mole) of 2-methoxy-6-cyano-9-chloroacridine in 125 cc. of methanol is heated on a steam bath for two hours. The mixture is cooled, and the crystalline dihydrochloride removed by filtration. The product is purified further by washing with acetone and recrystallization from methanol.

*Example 14.—2-methyl-6-chloro-9-(2'-chloro-5'-diethylaminomethylanilino)acridine dihydrochloride*

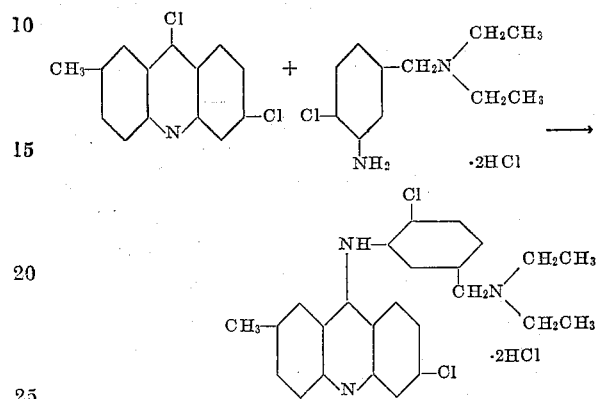

A mixture consisting of 6.0 g. (0.021 mole) of 2 - chloro-5-(diethylaminomethyl)aniline dihydrochloride and 5.5 g. (0.021 mole) of 2-methyl-6,9-dichloroacridine in 125 cc. of methanol is refluxed for two hours on a steam bath. The mixture is cooled, the crystalline dihydrochloride collected, washed with acetone and recrystallized from methanol.

*Example 15.—2,6 - dichloro - 9-(3'-N-piperidylmethylanilino)acridine dihydrochloride*

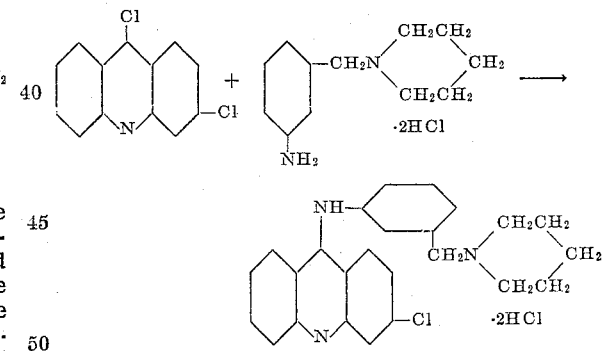

A mixture consisting of 6 g. (0.023 mole) of 3-N - piperidylmethylaniline dihydrochloride and 5.65 g. (0.023 mole) of 6,9-dichloroacridine in 100 cc. of methanol is refluxed for two hours. The mixture is cooled, the crude dihydrochloride collected and recrystallized from methanol.

The intermediate substituted aminomethyl-anilines can be prepared by halogenation of the corresponding nitrotoluene with chlorine or bromine in the presence of light or with halogenating agents, such as, sulfuryl chloride in the presence of organic peroxides; reacting the nitrobenzyl halide with an appropriate primary or secondary amine and reduction of the nitro group by known methods.

These substituted aminomethylanilines can also be prepared from an appropriately substituted benzyl alcohol by conversion of the aliphatic hydroxyl group to halogen; reaction of the halomethylaryl with an appropriate primary or secondary amine; nitration of the substituted aminomethylbenzene and reduction of the nitro group by known methods.

The various intermediate 9 - halogenated acridines can be prepared by methods similar to those described by Magidson and Travin [J. Gen. Chem. (U. S. S. R.), 11, 243-53 (1941)] and also by D. R. P. 565,411.

Although the above examples relate to the preferred products of the invention wherein the amino radical of group A of the general formula is entirely substituted and has no amino hydrogen atom, the invention in its broader aspects also embodies the preparation of compounds where R₄ is hydrogen and the group A has the formula

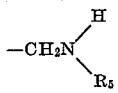

For example, the compound, 2-methoxy-6-chloro - 9-(4'-ethylaminomethylanilino) acridine dihydrochloride can be prepared by the same procedure as described in Example 1 by reacting the compound of the formula

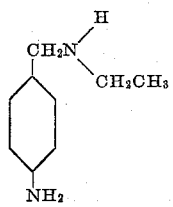

with the halogenated acridine compound having the formula

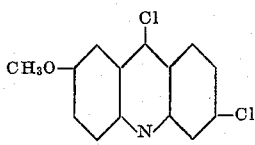

Attention is called to certain of applicants' copending applications which show and claim compounds having a structure somewhat resembling the compounds herein disclosed and claimed but differing therefrom in the fact that they contain hydroxylic substituents in the anilino radical. Among our copending applications relating to substituted amino-methyl-anilino acridine compounds also containing hydroxylic substituents in the anilino radical are the following: Serial No. 539,990, filed June 12, 1944; Serial No. 571,961, filed January 8, 1945; Serial No. 629,713, filed November 19, 1945.

What we claim as our invention is:

1. A compound of the class consisting of a free base and its acid addition salts, the free base of said compound having the formula

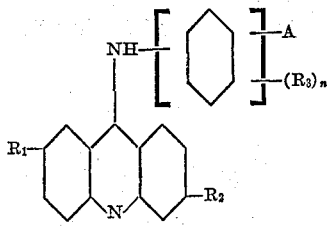

wherein R₁ and R₂ are substituents selected from the class consisting of hydrogen, lower alkyl, lower alkoxy, chlorine, bromine and —CN; (R₃)$_n$ represents $n$ substituents R₃, where $n$ has one of the values 0, 1, 2 and 3 and R₃ is a substituent of the class consisting of lower alkyl, chlorine, bromine, —CN and —NO₂; the group A in said formula has the formula

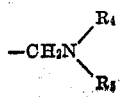

where R₄ is a member of the class consisting of hydrogen, lower alkyl and lower hydroxyalkyl, R₅ is a member of the class consisting of lower alkyl and lower hydroxyalkyl and further members in which R₄ and R₅ taken together with N form a heterocyclic ring consisting of a member of the class piperidine, morpholine, thiomorpholine, piperazine, pyrrolidine and pyrrole.

2. A compound of the class consisting of a free base and its acid addition salts, the free base of said compound having the formula

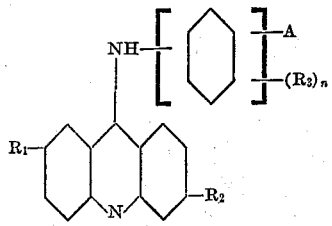

wherein R₁ and R₂ are substituents selected from the class consisting of hydrogen, lower alkyl, lower alkoxy, chlorine, bromine and —CN; (R₃)$_n$ represents $n$ substituents R₃, where $n$ has one of the values 0, 1, 2 and 3 and R₃ is a substituent of the class consisting of lower alkyl, chlorine, bromine, —CN and —NO₂; the group A in said formula has the formula

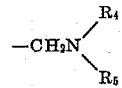

where R₄ and R₅ represent members of the class consisting of lower alkyl and lower hydroxyalkyl and further members in which R₄ and R₅ taken together with N form a heterocyclic ring consisting of a member of the class piperidine, morpholine, thiomorpholine, piperazine, pyrrolidine and pyrrole.

3. A compound having the formula,

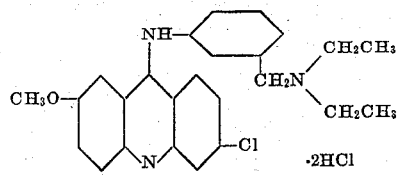

4. A compound having the formula,

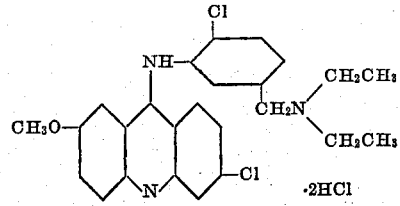

5. A compound having the formula,

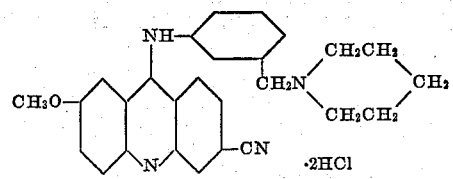

6. The process which consists in reacting the primary amino group of a compound having the formula

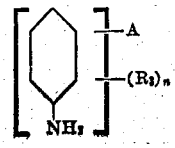

with a 9-halogenated acridine compound of the formula,

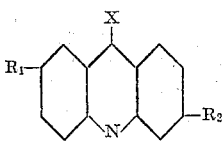

thereby forming hydrogen halide and a compound having the formula,

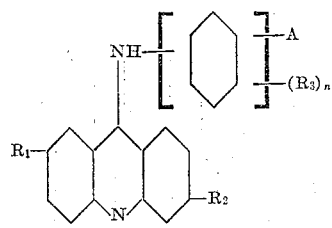

where X is a member of the class consisting of Cl and Br, wherein $R_1$ and $R_2$ are substituents selected from the class consisting of hydrogen, lower alkyl, lower alkoxy, chlorine, bromine and —CN; $(R_3)_n$ represents $n$ substituents $R_3$, where $n$ has one of the values 0, 1, 2 and 3 and $R_3$ is a substituent of the class consisting of lower alkyl, chlorine, bromine, —CN and —$NO_2$; the group A has the formula

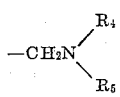

where $R_4$ and $R_5$ represent members of the class consisting of lower alkyl and lower hydroxyalkyl and further members in which $R_4$ and $R_5$ taken together with N form a heterocyclic ring consisting of a member of the class piperidine, morpholine, thiomorpholine, piperazine, pyrrolidine and pyrrole.

7. The process which consists in reacting a compound having the formula

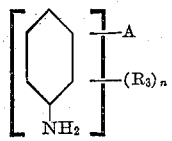

with a 9-halogenated acridine compound of the formula,

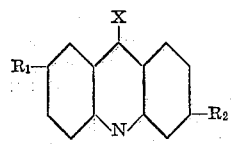

in the presence of an acid of the class consisting of concentrated and dilute organic acids and dilute mineral acids thereby forming hydrogen halide and a compound having the formula,

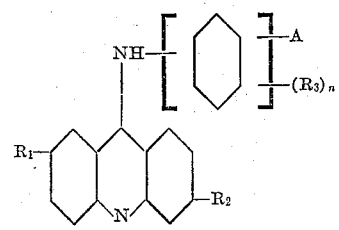

where X is a member of the class consisting of Cl and Br, wherein $R_1$ and $R_2$ are substituents selected from the class consisting of hydrogen, lower alkyl, lower alkoxy, chlorine, bromine and —CN; $(R_3)_n$ represents $n$ substituents $R_3$, where $n$ has one of the values 0, 1, 2 and 3 and $R_3$ is a substituent of the class consisting of lower alkyl, chlorine, bromine, —CN and —$NO_2$; the group A has the formula

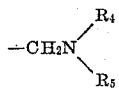

where $R_4$ and $R_5$ represent members of the class consisting of lower alkyl and lower hydroxyalkyl and further members in which $R_4$ and $R_5$ taken together with N form a heterocyclic ring consisting of a member of the class piperidine, morpholine, thiomorpholine, piperazine, pyrrolidine and pyrrole.

8. The process which consists in reacting a compound having the formula

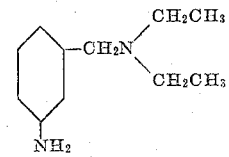

with an acridine compound having the formula,

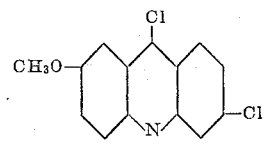

in the presence of an acid of the class consisting of dilute and concentrated organic acids and dilute inorganic acids thereby obtaining a compound having the formula,

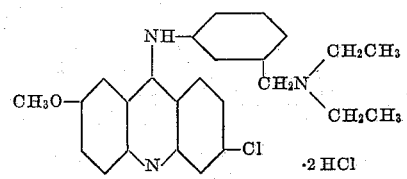

9. The process which consists in reacting a compound having the formula

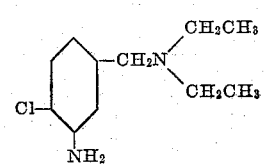

with an acridine compound having the formula,

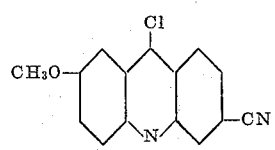

in the presence of an acid of the class consisting of dilute and concentrated organic acids and dilute inorganic acids thereby obtaining a compound having the formula,

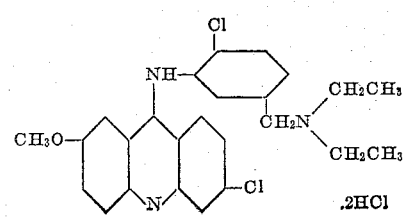

10. The process which consists in reacting a compound having the formula

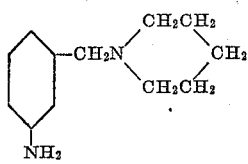

with an acridine compound having the formula,

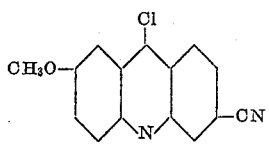

in the presence of an acid of the class consisting of dilute and concentrated organic acids and dilute inorganic acids thereby obtaining a compound having the formula,

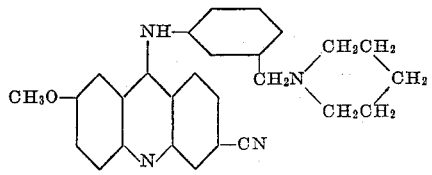

11. A compound of the class consisting of a free base and its acid addition salts, the free base of said compound having the formula,

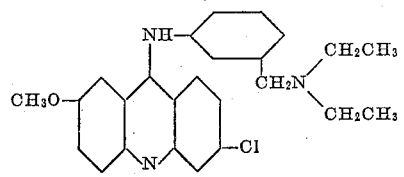

12. A compound of the class consisting of a free base and its acid addition salts, the free base of said compound having the formula,

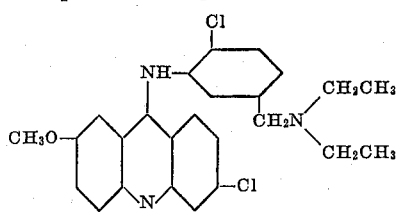

13. A compound of the class consisting of a free base and its acid addition salts, the free base of said compound having the formula,

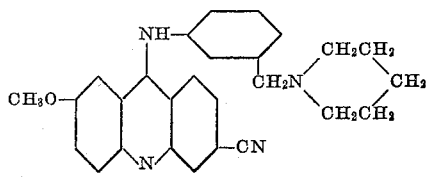

JOSEPH H. BURCKHALTER.
ALBERT L. RAWLINS.
FRANK H. TENDICK.
ELDON M. JONES.
WALTER F. HOLCOMB.

REFERENCES CITED

The following references are of record in the file of this patent:

UNITED STATES PATENTS

| Number | Name | Date |
|---|---|---|
| 2,113,357 | Mietzsch et al. | Apr. 5, 1938 |